(12) United States Patent
Stelmar Netto et al.

(10) Patent No.: US 11,601,693 B2
(45) Date of Patent: Mar. 7, 2023

(54) AUTOMATIC ADAPTATION OF DIGITAL CONTENT

(71) Applicant: KYNDRYL, INC., New York, NY (US)

(72) Inventors: Marco Aurelio Stelmar Netto, Sao Paulo (BR); Maryana Zanetti, Sao Paulo (BR); Roberto Guarda, Americana (BR); Marcio Rogerio Luccas, Sao Paulo (BR); Jyulian Kyohei Kuroba Kumeda, Osasco (BR); Thiago Rodrigues de Souza Costa, Belem (BR)

(73) Assignee: Kyndryl, Inc., New York, NY (US)

( * ) Notice: Subject to any disclaimer, the term of this patent is extended or adjusted under 35 U.S.C. 154(b) by 178 days.

(21) Appl. No.: 16/587,136

(22) Filed: Sep. 30, 2019

(65) Prior Publication Data
US 2021/0097287 A1    Apr. 1, 2021

(51) Int. Cl.
*G06V 20/00*     (2022.01)
*H04N 21/234*    (2011.01)
(Continued)

(52) U.S. Cl.
CPC ....... *H04N 21/23418* (2013.01); *G06F 18/22* (2023.01); *G06V 20/40* (2022.01); *G06V 20/41* (2022.01); *H04N 5/262* (2013.01)

(58) Field of Classification Search
CPC .................................................. G06K 9/00718
(Continued)

(56) References Cited

U.S. PATENT DOCUMENTS

| 4,052,699 A | 10/1977 | Micka |
| 7,319,780 B2 | 1/2008 | Fedorovskaya |

(Continued)

FOREIGN PATENT DOCUMENTS

| AU | 2015297035 B2 | 6/2018 |
| CN | 102799884 B | 5/2015 |
| WO | 2019067783 A1 | 4/2019 |

OTHER PUBLICATIONS

Choy et al., "Treatment of specific phobia in adults", ScienceDirect, Clinical Psychology Review 27 (2007) 266-286, Received Feb. 14, 2006; received in revised form Sep. 28, 2006; accepted Oct. 2, 2006, © 2006 Elsevier Ltd., 21 pages.

(Continued)

*Primary Examiner* — Daniel T Tekle
(74) *Attorney, Agent, or Firm* — Erik Swanson; Matthew M. Hulihan; Heslin Rothenberg Farley & Mesiti PC

(57) ABSTRACT

Embodiments of the present invention provide methods, computer program products, and systems for adapting digital content. Embodiments of the present invention can be used to identify one or more entities in media content. Embodiments of the present invention can determine that an identified entity of the one more identified entities is associated with sensitive material. Embodiments of the present invention can, in response to determining that the identified entity of the one or more identified entities is sensitive, determine a contextual impact of the identified entity. Embodiments of the present invention can also be used to modify the media content based on the determined contextual impact of the identified entity.

8 Claims, 7 Drawing Sheets

(51) Int. Cl.
  *H04N 5/262* (2006.01)
  *G06V 20/40* (2022.01)
  *G06F 18/22* (2023.01)

(58) Field of Classification Search
  USPC .......................................................... 382/100
  See application file for complete search history.

(56) References Cited

U.S. PATENT DOCUMENTS

| | | | |
|---|---|---|---|
| 10,332,315 B2 | 9/2019 | Samec | |
| 2011/0245633 A1 | 10/2011 | Goldberg | |
| 2012/0124456 A1* | 5/2012 | Perez | G06Q 30/06 |
| | | | 715/200 |
| 2013/0283162 A1* | 10/2013 | Aronsson | H04N 21/42201 |
| | | | 715/719 |
| 2014/0306954 A1 | 10/2014 | Kao | |
| 2014/0343962 A1* | 11/2014 | Xu | G16H 15/00 |
| | | | 705/3 |
| 2015/0262429 A1* | 9/2015 | Shuster | A61B 5/4863 |
| | | | 345/633 |
| 2016/0381415 A1* | 12/2016 | Vijay | G06F 3/016 |
| | | | 725/12 |
| 2017/0098467 A1* | 4/2017 | Holly | G06F 16/252 |

OTHER PUBLICATIONS

Garcia-Palacios et al., "Virtual reality in the treatment of spider phobia: a controlled study", Pergamon, Behaviour Research and Therapy 40 (2002) 983-993, Accepted Jul. 1, 2001, © 2002 Elsevier Science Ltd., 12 pages.

Olsen, Jacob, "Phobia Statistics and Surprising Facts About Our Biggest Fears", Copyright © 2019, 11 pages, <https://www.fearof.net/phobia-statistics-and-surprising-facts-about-our-biggest-fears/>.

Van Dusen, Allison, Our Most Common Fears, Dec. 14, 2006, 3 pages, <https://www.forbes.com/2006/12/13/most-common-fears-forbeslife-cx_avd_1214commonfears.html#6101bf291ae5>.

Mell et al., "The NIST Definition of Cloud Computing", Recommendations of the National Institute of Standards and Technology, NIST Special Publication 800-145, Sep. 2011, 7 pages.

\* cited by examiner

AUTOMATIC ADAPTATION OF DIGITAL CONTENT

BACKGROUND

The present invention relates generally to the wearable technology, and more particularly to content modification of media displayed on a wearable device.

In general, social media refers to interactive computer-mediated technologies that facilitate the creation and sharing of information, ideas, career interests and other forms of expression via virtual communities and networks. Typically, users can access social media via interactive Web 2.0 Internet-based applications. Examples of content that can be found on social include user-generated content, such as text posts or comments, digital photos or videos, and data generated through all online interactions.

Wearable technology, wearables, typically refer to one or more smart electronic devices (e.g., electronic device with micro-controllers) that can be incorporated into clothing or worn on the body as implants or accessories. For example, wearable devices such as activity trackers that enable objects to exchange data through the internet with a manufacturer, operator, and/or other connected devices, without requiring human intervention. Wearable technology has a variety of applications and is prominent in consumer electronics with the popularization of smartwatches and activity trackers.

SUMMARY

Embodiments of the present invention provide methods, computer program products, and systems for identifying one or more entities in media content; determining that an identified entity of the one more identified entities is associated with sensitive material; in response to determining that the identified entity of the one or more identified entities is sensitive, determining a contextual impact of the identified entity; and modifying the media content based on the determined contextual impact of the identified entity.

DETAILED DESCRIPTION

Embodiments of the present invention recognize that wearable technology can be used to display content accessed by a user. Embodiments of the present invention further recognize that content accessed by the user can have adverse effects on the user viewing that content. As such, embodiments of the present invention provide solutions to minimize the adverse effects that viewed content can have on a user. In particular, embodiments of the present invention improve wearable devices by enabling these wearable devices to adapt or otherwise modify content in a manner that reduces adverse effects on the user. Embodiments of the present invention modify content by identifying entities in the content, and identifying whether entities in content are associated with entities having adverse effects on the users. Embodiments of the present invention can then modify the content without changing context associated with content as discussed in greater detail later in this Specification.

Figure 1:
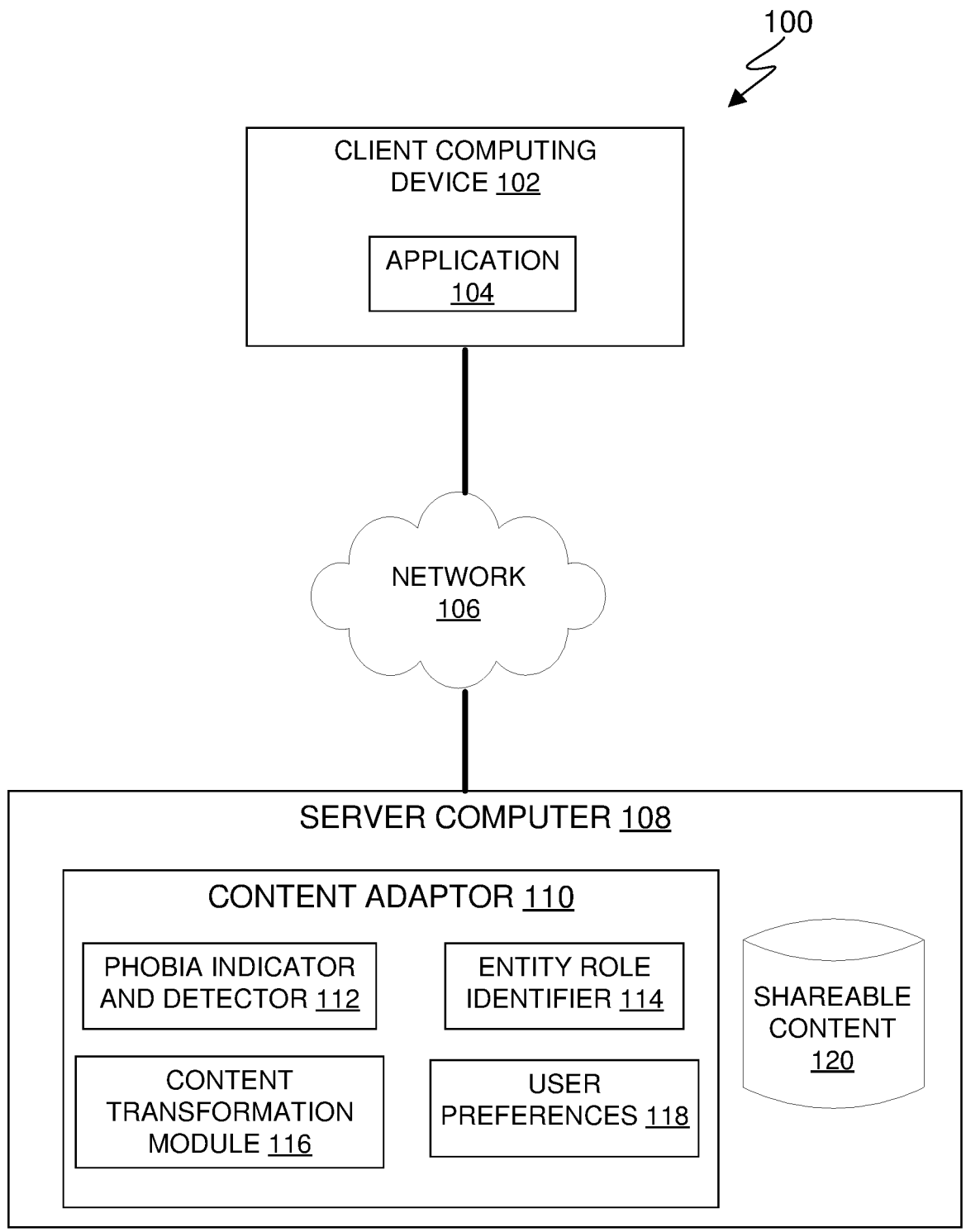
FIG. 1 is a functional block diagram illustrating an computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 7.

Client computing device 102 is a digital device associated with a user and includes application 104. Application 104 communicates with server computer 108 to access content adaptor 110 (e.g., using TCP/IP) to access content. Application 104 can further communicate with content adaptor 110 to transmit instructions to automatically modify content viewed by a user based on the user's preferences. Application 104 can receive modified content and display the modified content as discussed in greater detail with regard to FIGS. 2-4. In some embodiments, application 104 can transmit requests to content adaptor 110 to modify content specified by a user or according to user preferences. In other embodiments, application 104 can transmit user preferences. In general, application 104 can be implemented using a browser and web portal or any program that can interface with or otherwise access content adaptor 110.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts content adaptor 110 and shareable content 120. In this embodiment, shareable content 120 functions as a repository for stored content. Shareable content 120 can reside on a cloud infrastructure (shown in greater detail with regards to FIGS. 5 and 6) and stores user generated content. In some embodiments, shareable content 120 can function as a repository for one or more files containing information associated with a user using a content sharing service (e.g., social media website, applications, etc.).

As used herein, "content" refers to one or more files that contain information or data. In this embodiment, content can refer to media files (e.g., image or video files). In other embodiments, content can include audio and text. In this embodiment, content can also refer to information contained in social media websites. For example, content can also include videos hosted on a social media website, live streaming videos, and interactive push notifications that contain a clickable image or video.

In general, shareable content 120 can be implemented using any non-volatile storage media known in the art. For example, shareable content 120 can be implemented with a tape library, optical library, one or more independent hard disk drives, or multiple hard disk drives in a redundant array of independent disk (RAID).

Content adaptor 110 enables modification (i.e., adaptation) of content viewed by the user. Content adaptor 110 can be integrated into a wearable device that displays content to the user. In other embodiments, content adaptor 110 can be stored locally on client computing device 102. In yet other embodiments, content adaptor 110 can be stored on a combination of client computing device 102, server computer 108, or any other component of computing environment 100.

Content adaptor 110 receives content to be analyzed and determines media type of the received content. In this embodiment, content adaptor 110 can identify media type of content based on a file extension associated with the content. For example, content adaptor 110 can identify image files based on file extensions (e.g., jpeg, tiff, gif, raw images, etc.) and can similarly identify videos files based on file extensions (e.g., avi, fly, wmv, .mov, .mpeg, .mp4, etc.). In other embodiments, content adaptor 110 can receive content from one or more components of computing environment 100 (e.g., application 104, sharable content 120).

Content adaptor 110 modifies content in a manner that reduces adverse effects on the user. Content adaptor 110 includes phobia indicator and detector 112, entity role identifier 114, content transformation module 116, and user preferences 118. Content adaptor 110 modifies content by identifying media type associated with received content, identifying entities in the content as being associated with sensitive material, determining a contextual impact of the identified entity in relation to the entirety of content being analyzed, and modifying the content to reduce an adverse effect of the sensitive material on the user. In this embodiment, content adaptor 110 can modify content dynamically as the user is viewing the content by scanning portions of content the user has not yet viewed. In other embodiments, content adaptor 110 can receive content before it is viewed by the user and modify all portions of the received content before the user has viewed the content.

As used herein, "sensitive material" or "sensitive information" refers to information contained in content accessed by the user that can have an adverse effect on the user (e.g., increased stress levels). Sensitive material can also refer to information in content that can have a negative impact on the user's mood. For example, sensitive material can be a phobia of the user (e.g., claustrophobia, aerophobia, arachnophobia, emetophobia, etc.) or an insulting image, audio, or video.

An "entity" as used herein, refers to portions of content that are identified by content adaptor 110. An entity can be sensitive material or associated with sensitive material. For example, a user profile may indicate that a user has an adverse reaction to spiders and that some flowers may look similar to spiders and thus have an adverse effect on the user. Accordingly, in instances where content adaptor 110 has received an image file depicting a flower and a bee, content adaptor 110 can identify the flower and a bee as entities of the received content. Adaptor 110 can then generate a similarity score for the identified flower as being similar to a phobia (e.g., spiders) and based on the generated similarity score, identify that the flower as being associated with sensitive material.

In this embodiment phobia indicator and detector 112 can use any combination of natural language processing techniques and machine learning algorithms to identify entities in content that have potential for being sensitive. In other embodiments, phobia indicator and detector 112 can identify phobia types from a user's profile in response to receiving content to be reviewed.

Phobia indicator and detector 112 can also leverage a wearable device's sensors to measure biometrics of the user and determine stress levels based on the measured physical reactions of the user. In embodiments where phobia indicator and detector 112 measures physical reactions of the user, content adaptor 110 provides a mechanism for the user to provide informed consent via an opt-in/opt-out feature. In this embodiment, phobia indicator and detector 112 obtains consent from the user before any data collection regarding a user or a group of users happens. In certain instances, content adaptor 110 can transmit a notification when data collection is taking place.

In certain other embodiments, content adaptor 110 can utilize phobia indicator and detector 112 to identify context of the content and identify contextual impact of the entity associated with sensitive information. In this embodiment, phobia indicator and detector 112 can identify context of the content using a combination of image recognition, natural language processing, machine learning, and artificial intelligence algorithms.

Content adaptor 110 then determines contextual impact of the entity associated with sensitive information. In this embodiment, content adaptor 110 uses entity role identifier 114 to assess the impact of the potentially sensitive information found by phobia indicator and detector 112. In this embodiment, entity role identifier 114 determines an impact of the potentially sensitive information by calculating a percentage of content that displays the potentially sensitive information as discussed in greater detail with regard to FIGS. 2 and 3. For example, phobia indicator and detector 112 can identify an image containing a flower that a bee is pollinating and that the user has a fear of spiders. Entity role identifier 114 can then identify that the flower displayed in the image has a percentage of relevancy (e.g., 100% relevancy) to the photo because the text accompanying the image indicates that the image displayed is an example of how bees can pollinate different types of flowers.

Content adaptor 110 can then modify the content according to user preferences, contextual impact of the identified entity associated with sensitive material, and one or more specified content modification settings. In this embodiment, content adaptor 110 modifies the content using content transformation module 116. In this embodiment, content transformation module 116 modifies content according to user preferences, transformation rules, and media type. For example, in instances where content adaptor 110 has determined the context associated with content, determined that sensitive material is present in the viewed content, determined that the impact of the sensitive material exceeds a threshold percentage (e.g., either by exceeding a percentage of a duration of time or percentage of display), then content adaptor 110 can use content transformation module 116 to modify the content to remove and/or replace the sensitive material such that the context associated with the content is not changed as described in greater detail with regard to FIGS. 2 and 3.

In this embodiment, a transformation rule can specify that an entity identified as being associated with sensitive material can be removed or replaced with an alternate entity that does not alter the context of the media being viewed by the user. A transformation rule can also reference one or more ameliorative actions (i.e., one or more actions that can have positive mood changing effects on a user) that mitigate the impact of sensitive material. For example, where a user profile indicates the user has a fear of spiders and a trigger associated with the spiders (e.g., the user can be impacted by the fear of spiders when flowers that resemble spiders are viewed), content adaptor 110 can use content transformation module 116 to alter images presenting an entity that resembles a spider (e.g., a magnolia that resembles a spider) with a different entity that is representative of entities being depicted in the content that has no similarity to entities associated with sensitive material (e.g., a different image of a flower such as an orchid). In another example, content adaptor 110 can remove the identified entity from the content if content adaptor 110 determines the identified entity does not alter the context of the received content.

Transformation rules can also specify modifications according to Gestalt rules. For example, a transformation rule can specify when entities appear to be similar to each other (e.g., to have a percentage threshold score of similarity based on features identified in each content displaying entities), the entities tend to be grouped together. Accordingly the same rule is applied for both entities (e.g., modifying the video or image for the user). In another example, a transformation rule can be a closure principle that states that in a complex arrangement of visual elements, users tend to recognize a pattern as a single entity. For example, content adaptor 110 can identify relatedness of identified entities to sensitive material by generating a similarity score of an identified entities to images of known entities that have adverse effects on the user. Content adaptor 110 can then, in response to the similarity score of the identified entity reaching or exceeding the threshold level for similarity, classify the identified entity as being sensitive material and modify accordingly.

Content adaptor 110 can then monitor and record user biometrics using phobia indicator and detector 112 to determine whether the ameliorative action (e.g., content transformation) of the content having sensitive material was successful. In this embodiment, content adaptor 110 determines whether the ameliorative action was successful by comparing biometrics of a user to a baseline biometric measurements of the user. For example, in instances where a user has viewed content having sensitive material, content adaptor 110 can capture user biometrics and identify that the user's heartrate is 150 beats per minute (BPM). Content adaptor 110 can then receive user biometrics immediately after the ameliorative action was taken and identify that the user's heartrate is 110 BPM. Content adaptor 110 can then determine that user's heartrate has lowered. In certain other embodiments, content adaptor 110 can compare user biometrics taken after the ameliorative action has been performed to baseline measurements of the user and determine a measure of deviation from the baseline user biometrics. In instances where a threshold level of user biometrics is met (e.g., within an acceptable user biometric range for heart rate measurements), content adaptor 110 can identify that the ameliorative action was successful.

In instances where the ameliorative action was not successful, content adaptor 110 can refine its transformation rules and apply a different modification. Content adaptor 110 can iteratively perform transformation modifications to content until the ameliorative action has reached acceptable levels of mitigation.

User preferences 118 contains preferences of the user. In this embodiment, user preferences 118 contains user profiles that specifies phobias, images and actions that can reduce phobias specific to the user, and biometric information of the user. In general, user preferences 118 can be implemented using any non-volatile storage media known in the art. For example, user preferences 118 can be implemented with a tape library, optical library, one or more independent hard disk drives, or multiple hard disk drives in a redundant array of independent disk (RAID).

Figure 2:
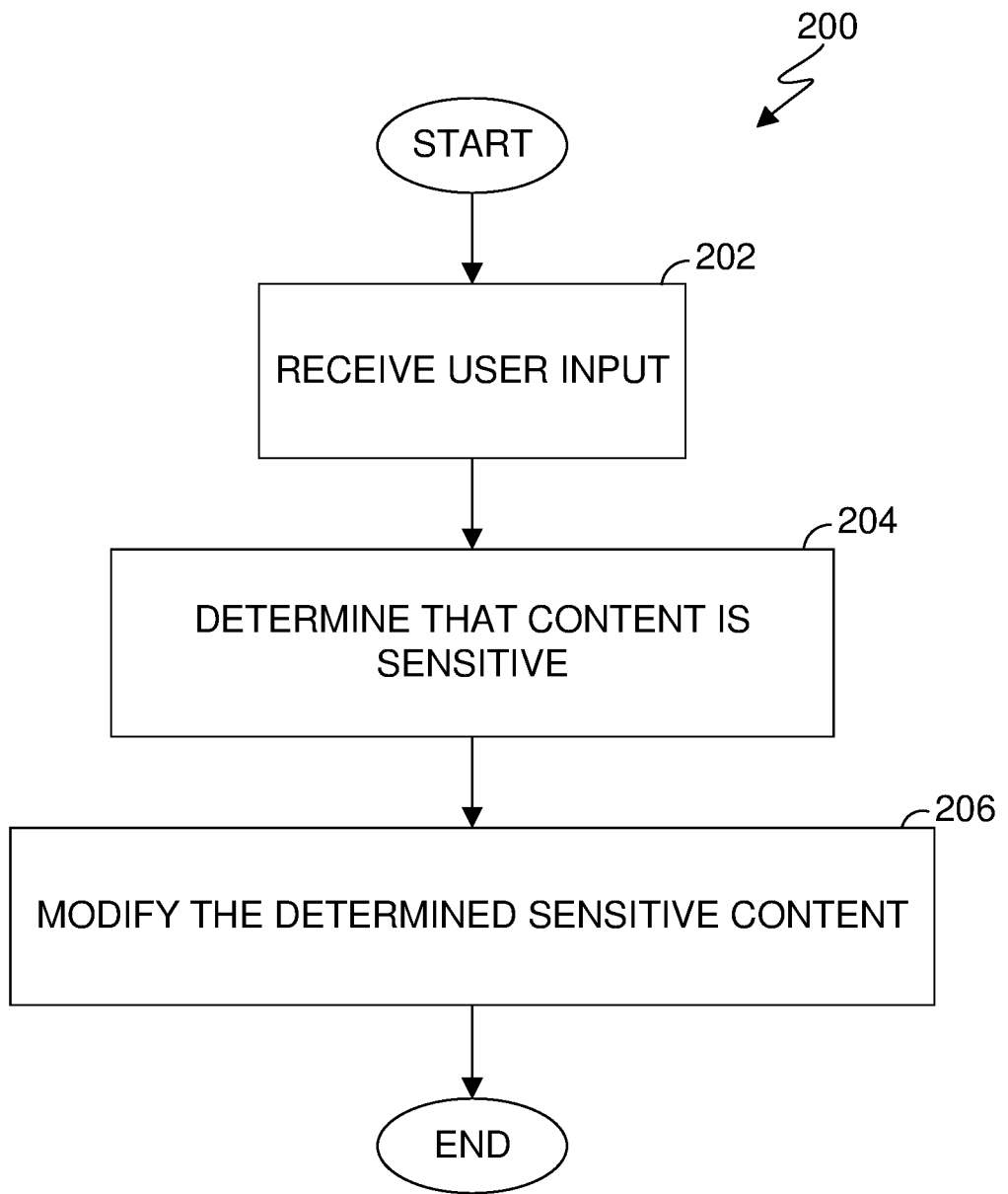
FIG. 2 is flowchart depicting operational steps for dynamically modifying sensitive content, in accordance with an embodiment of the present invention.

FIG. 2 is flowchart 200 depicting operational steps for dynamically modifying sensitive content, in accordance with an embodiment of the present invention.

In step 202, content adaptor 110 receives user input. In this embodiment, content adaptor 110 receives input from application 104 via network 106. In this embodiment an input can include user requests (e.g., content to be analyzed), user preferences (e.g., modification rules), user health history (e.g., phobias and successful mitigation strategies for respective phobias), biometric information of the user that show physiological characteristics (e.g., heart rate, facial recognition, skin conductivity, retina, rhythm, gait, voice, etc.), and user provided answers (e.g., responses to surveys).

A user input can also be user interaction with content. For example, a user can be viewing a website containing media (e.g., a social media website displaying pictures). In this embodiment, content adaptor 110 can be configured to automatically receive user input such as a user interaction with content (e.g., via a user-specified setting). In another example, content adaptor 110 can receive content that is a video file.

User input can also include requests (e.g., a request that specifies content to be analyzed). For example, a user may utilize application 104 to transmit a request to analyze a video file. In certain embodiments, content adaptor 110 can directly receive files (e.g., audio, video, image, etc.) to be analyzed via application 104. In yet other embodiments, content adaptor 110 can receive user input from one or more other components of computing environment 100.

In step 204, content adaptor 110 determines that content is sensitive. In this embodiment, content adaptor 110 determines that content is sensitive by identifying media type of the content, identifying entities in the content, and determining whether the identified entities are associated with sensitive material, determining a contextual impact of the identified entity as discussed in greater detail with regard to FIG. 3.

In step 206, content adaptor 110 modifies the determined sensitive content. In this embodiment, content adaptor 110 modifies the determined sensitive content according to user preferences, contextual impact of sensitive material in relation to content being viewed, and one or more specified content modification settings. In this embodiment, content adaptor 110 modifies the content using content transformation module 116. In this embodiment, content transformation module 116 modifies content according to user preferences, transformation rules, and media type.

Figure 3:
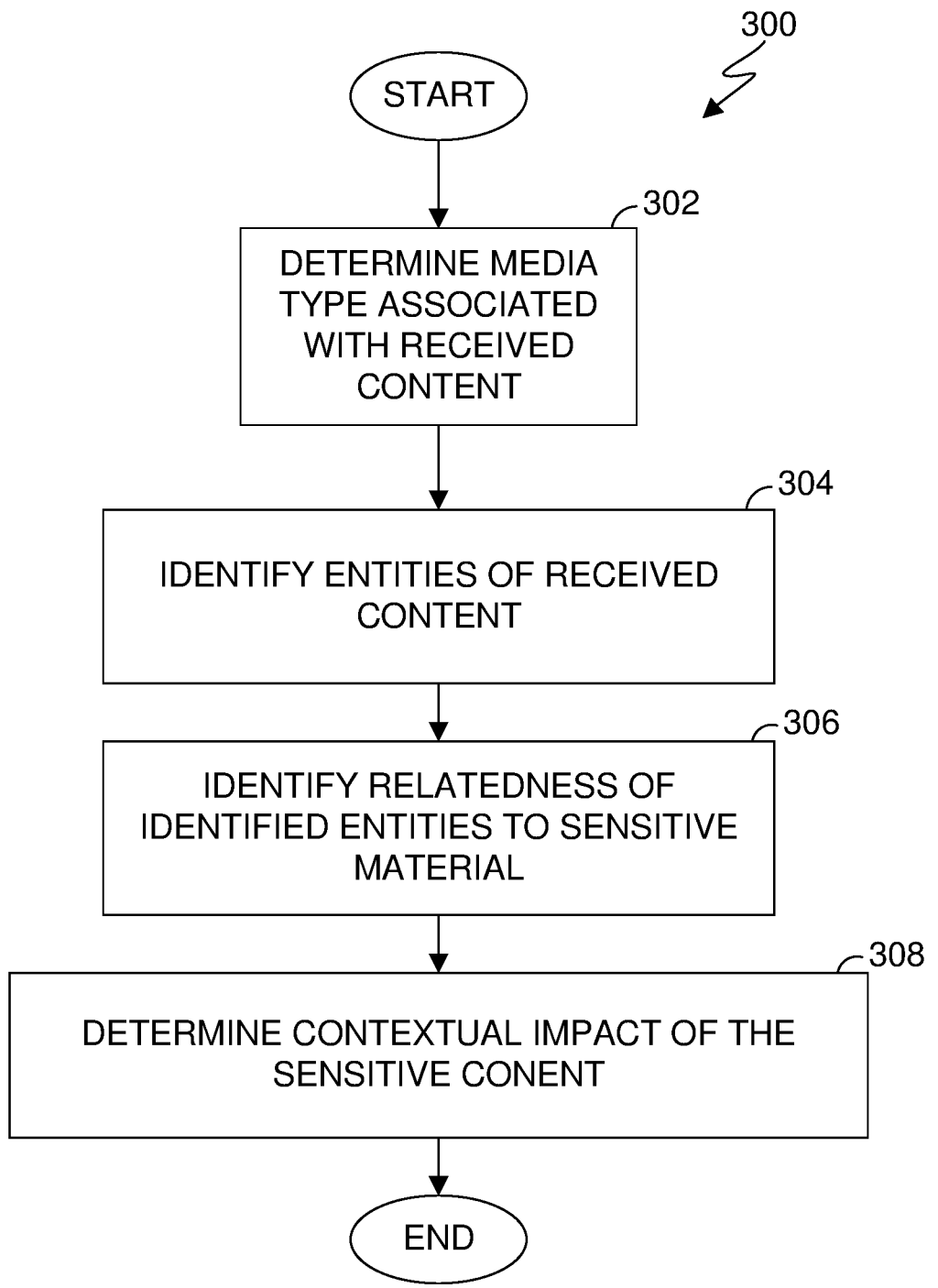
FIG. 3 is a flowchart depicting operational steps for determining whether received content is sensitive and contextual impact of sensitive material, in accordance with an embodiment of the present invention.

For example, in instances where content adaptor 110 has determined the context associated with content, determined that sensitive material is present in the viewed content, determined that the impact of the sensitive material exceeds a threshold percentage, content adaptor 110 can use content transformation module 116 to modify the content to remove and/or replace the sensitive material such that the context associated with the content is not changed as described in greater detail with regard to FIG. 3. In certain instances, user preferences may specify instructions to either remove or replace the entity associated with sensitive material.

In other embodiments, content adaptor 110 can automatically alter content without user intervention to generate a modified version of content. For example, in some embodiments, content adaptor 110 can alter the entity associated with sensitive material so that the entity is still representative of an entity conveyed in the unmodified content. For example, where content adaptor 110 has identified an entity such as a flower (e.g., a rose) is sensitive material (e.g., that the user is afraid of spiders and some flowers may resemble flowers) and the contextual impact of the identified entity would change the context of the content (e.g., if the picture only depicts an rose), content adaptor 110 can alter the identified flower to show a different flower (e.g., an orchid).

In yet other embodiments, content adaptor 110 can alter content by generating a modified version of the content that does not include sensitive material. In this embodiment, in response to content adaptor 110 determining that the percentage of sensitive material displayed in content does not exceed a threshold level of exposure, content adaptor 110 can alter the content by removing the entity without replacing the entity. Continuing the above example (e.g., where a flower is indicated as sensitive material), content adaptor 110 can identify that the received content depicts more than one entity (e.g., a group of friends of the user posed against a bed of flowers). Content adaptor 110 can identify the group of friends as one entity and the bed of flowers as the second entity. Content adaptor 110 can further identify that the contextual impact of the bed of flowers does not exceed a threshold value. Content adaptor 110 can then, in response to identifying that the contextual impact of the flowers does not exceed a threshold value for impact, alter the received content and generate a modified version of the content that only depicts the group of friends.

In certain instances, content adaptor 110 can reference user preferences to determine whether a user has applied a particular modification in response to a detected entity associated with sensitive material. In those instances, content adaptor 110 can then apply a previous modification (e.g., adaptation) that the user specified as having an ameliorative effect.

In instances where content adaptor 110 does not have a reference of user preferences, content adaptor can monitor and record user biometrics using phobia indicator and detector 112 to determine whether the ameliorative action (e.g., content transformation) of the content having sensitive material was successful. In this embodiment, content adaptor 110 determines whether the ameliorative action was successful by comparing biometrics of a user to a baseline biometric measurements of the user.

In instances where the ameliorative action was not successful, content adaptor 110 can refine is transformation rules and apply a different modification. Content adaptor 110 can iteratively perform transformation modifications to content until the ameliorative action has reached acceptable levels of mitigation.

Regardless of whether the ameliorative action was or was not successful, content adaptor 110 can refine its modification practices by transmitting a survey to the user and receive feedback from the user. In other embodiments, content adaptor 110 can automatically determine success or failure of an ameliorative action by measuring deviations in baseline biometrics of the user.

FIG. 3 is a flowchart 300 depicting operational steps for determining whether received content is sensitive and contextual impact of sensitive material, in accordance with an embodiment of the present invention.

In step 302, content adaptor 110 determines media type associated with received content. In this embodiment, content adaptor 110 determines media type associated with received content by identifying file extensions associated with the received content. For example, content adaptor 110 can use file extensions (e.g., jpeg, tiff, gif, raw images, etc.) to identify image files and can similarly identify videos files based on file extensions (e.g., avi, fly, wmv, .mov, .mpeg, .mp4, etc.).

In step 304, content adaptor 110 identifies entities in content. In this embodiment content adaptor 110 identifies entities in the content using a combination of image recognition, natural language processing, machine learning, and artificial intelligence algorithms. For example, content adaptor 110 can use phobia indicator and detector 112 to identify entities from a received user input containing an image. In this example, content adaptor 110 can identify a flower and a bee as entities of the image. Content adaptor 110 can then identify a context of the image using natural language processing to identify that the image is captioned with text that states the bee is pollinated the flower.

In step 306, content adaptor 110 identifies relatedness of identified entities to sensitive material. In this embodiment, content adaptor 110 can identify relatedness of identified entities to sensitive material by referencing user preference to identify user's phobias and stress indicators as well as Gestalt similarity principles. Content adaptor 110 can then identify the relatedness of the identified entities to sensitive material by generating a similarity score of an identified entities to images of known entities that have adverse effects on the user. Content adaptor 110 can then, in response to the generated similarity score of the identified entity reaching or exceeding the threshold level for similarity, classify the identified entity as being associated with sensitive material.

In this example, the user's profile (stored in user preferences 118) indicates that the spiders can induce stress and anxiety to the user. Content adaptor 110 can then perform image analysis to determine a similarity score of the flower resembling a spider.

In other embodiments, content adaptor 110 can utilize image analysis and determine a similarity score of an identified entity to entities designated as being associated with sensitive material. For example, content adaptor 110 can identify entities of a content, and compare each of the identified entities against entities being associated with sensitive material. In response to the similarity score for an identified entity reaching or exceeding a user-specified threshold, content adaptor 110 can classify the identified entity as being sensitive material.

In step 308, content adaptor 110 identifies a contextual impact of the entity identified as being sensitive material. In this embodiment, content adaptor 110 identifies a contextual impact of the entity identified as being associated with sensitive material by referencing the determined media type (e.g., image or video). In other embodiments, content adaptor 110 can identify other media types (e.g., audio, text, etc.). Content adaptor 110 can then calculate a percentage of time the entity is displayed (e.g., where the media type is identified as a video) or a percentage of size the entity occupies in an image (e.g., where the media type is identified as an image). Content adaptor 110 can then identify the contextual impact of the identified entity based on the calculated percentage as discussed in greater detail below.

In this embodiment, where content adaptor 110 identifies the media type of the content to be a video, content adaptor 110 calculates a percentage of impact the entity has by calculating a percentage of time the entity is displayed in the video and an average number of frames that entity is displayed in the video. Content adaptor 110 identifies a length of the video and a number of frames per second being displayed. Content adaptor 110 then identifies a total number of frames being displayed by multiplying the length of time (e.g., in seconds) by the number of frames being displayed (e.g., per second). Content adaptor 110 can then identify an amount of frames the entity is displayed in relation to the total number of frames displayed during the length of time (e.g., the percentage of time the entity is displayed).

For example, where a video file is 60 second long, content adaptor 110 can identify that the frame rate is 24 frames per second. Content adaptor 110 can then calculate there are 1440 frames total (e.g., 60 s×24 f/s) in the 60 second video (e.g., one minute). Content adaptor 110 can then utilize image recognition analysis to identify an amount of frames the entity identified as being sensitive material is displayed during the video. In this example, content adaptor 110 has identified that the entity is depicted for 150 frames.

In this embodiment, where content adaptor 110 identifies the media type of the content to be an image, content adaptor 110 calculates a percentage of impact the entity has by calculating a percentage of size the entity has in relation to the entire image. In this embodiment, content adaptor 110 identifies a context surrounding identified entities of the image. Content adaptor 110 can then identify a percentage of size according to the context identified or the physical space an entity occupies of the whole image. For example, where a user has an adverse reaction to a depiction of a spider and content adaptor 110 has identified that an image displays a flower and a bee, content adaptor 110 can then identify relatedness of the flower and the bee to entities that the user has adverse reactions. In this example, content adaptor 110 has identified that the flower depicted in the image reaches the threshold similarity to a spider that the user has adverse reactions to. Content adaptor 110 can then identify the context surrounding the picture from textual information (e.g., the image has an accompany tag that that says, "pollination"). Content adaptor then identifies that the flower takes up 50% of the depicted image.

Regardless of media type, content adaptor 110 then identifies the contextual impact of the entity based on the calculated percentage. In this embodiment content adaptor 110 identifies the contextual impact of the entity as being relevant to the content (e.g., that deleting the entity would alter the context of the displayed content) by comparing the calculated percentage (e.g., the calculated percentage of impact the identified entity has) against a threshold percentage of impact.

In this embodiment, content adaptor 110 identifies that the contextual impact of the entity in a video as being relevant when the calculated percentage of impact for the video is greater than 1% and the average number of frames is greater than thirty (30) frames per second. Content adaptor 110 can then reference user preferences to identify whether a previous filter or modification rule has been used for the identified entity. If content adaptor 110 identifies that a previous filter or modification rule has been used and had an ameliorative effect on the user, then content adaptor 110 uses the previous filter or modification.

In instances where a previous filter or modification rule has not been used, content adaptor can modify the content to alter the image or video shown by predicting a substitute image to use, using Gestalt rules and user preferences. For example, where an video depicting a rose and a bee is presented and content adaptor 110 has identified the rose as the entity having a similarity score exceeding the threshold score for entities associated with sensitive material, content adaptor 110 can substitute the rose for a different type of flower such as an orchid.

Content adaptor 110 identifies that the contextual impact of the entity in a video as being not relevant when the calculated percentage of impact for videos is not greater than 1% and the average number of frames is not greater than 30 frames per second. In those instances, content adaptor 110 can then modify the content by deleting the entity identified as being sensitive material. For example, where a video depicts a rose and a group of the users friends, content adaptor 110 can identify the rose as being associated with sensitive material and modify the received content to generate a new version of the content that depicts only the group of the users friends interacting.

In this embodiment, content adaptor 110 identifies that the contextual impact of the entity in an image as being relevant when the calculated percentage of impact for image is greater than 3% of the whole image. For example, where an image depicting a rose and a bee is presented and content adaptor 110 has identified the rose as the entity being associated with sensitive material, content adaptor 110 can substitute the rose for a different type of flower such as a magnolia.

In this embodiment, content adaptor 110 identifies that the contextual impact of the entity in an image as being non relevant when the calculated percentage of impact for image is not greater than 3% of the whole image. For example, where an image depicting a rose and a bee is presented and content adaptor 110 has identified the rose as the entity being associated with sensitive material, content adaptor 110 can substitute the rose for a different type of flower such as an orchid. For example, where an image depicting a rose and a group of the users friends, content adaptor 110 can identify the rose as being sensitive material and modify the received content to generate a new version of the content that depicts only the group of the users friends.

Accordingly, content adaptor 110 can modify the content based on the contextual impact of the entity. In some instances, content adaptor 110 can remove the entity from the content while in other instances content adaptor 110 can modify the content by generating another version of the content that may substitute or alter the entity identified as sensitive material such that the substation or alternation does not change the context of the content being viewed by the user. Content adaptor 110 can then refine its modification and transformation rules based on user feedback and can further modify the content as needed.

Figure 4:
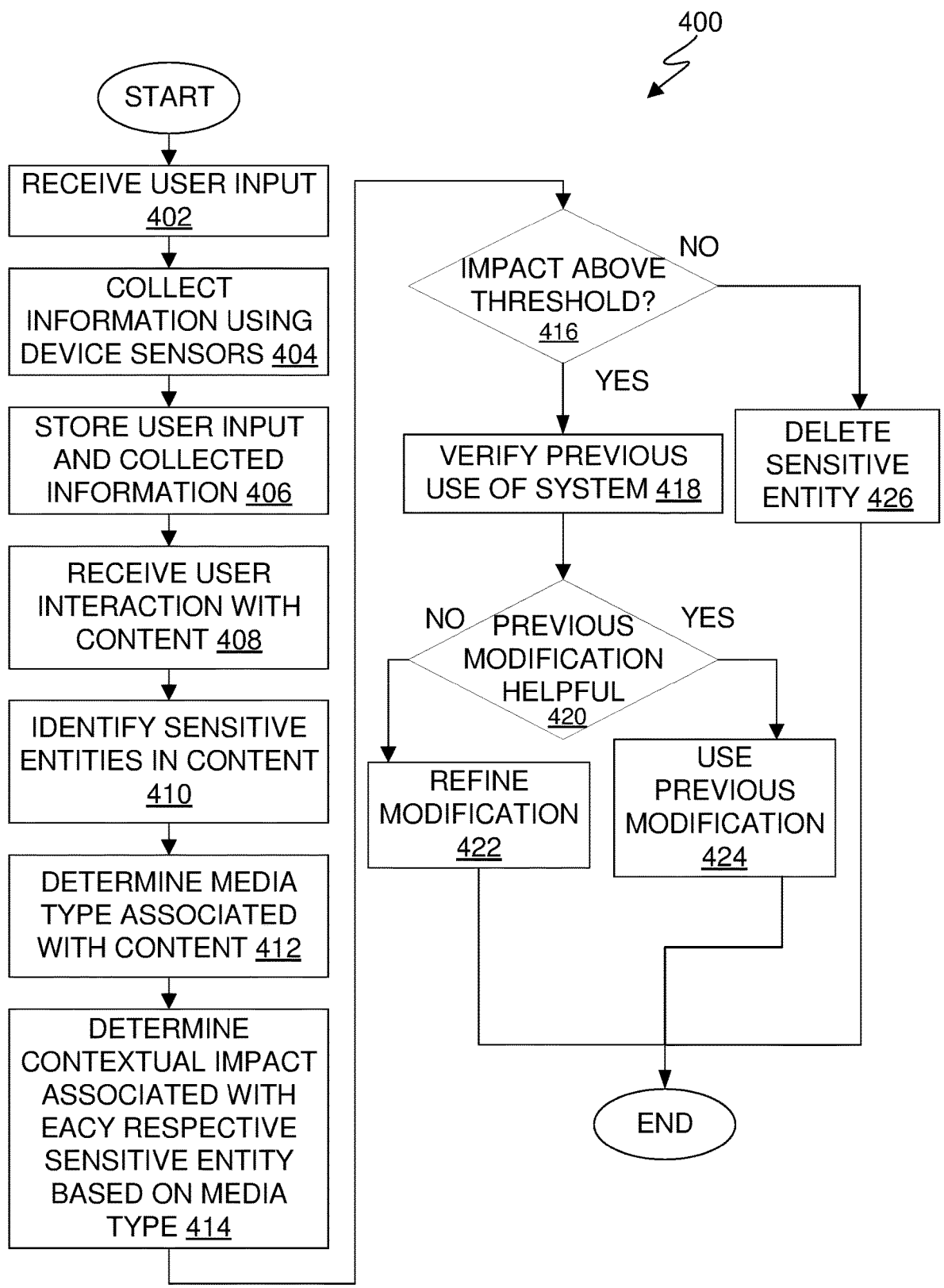
FIG. 4 is a flowchart depicting an alternate set of operational steps of dynamically modifying and refining sensitive content, in accordance with an embodiment of the present invention.

FIG. 4 is a flowchart 400 depicting an alternate set of operational steps of dynamically modifying and refining sensitive content, in accordance with an embodiment of the present invention.

In step 402, content adaptor 110 receives user input. In this embodiment, content adaptor 110 receives user input via application 104. In this example, a user input can be user responses to a questionnaire, survey, or user specified information. For example, content adaptor 110 can receive user input from a questionnaire with animals and objects that the user may have adverse reactions to (e.g., can affect the user's mood in a negative matter). In other embodiments, content adaptor 110 can receive user input from one or more other components of computing environment 100.

In step 404, content adaptor 110 collects information using device sensors. In this embodiment, content adaptor 110 collects information using device sensors. For example, content adaptor 110 can transmit instructions to a user device (e.g., a wearable) to send adaptor 110 biometric information of the user (with user consent). In this embodiment, content adaptor 110 collections information of the user to identify sensitive material (e.g., phobias, entities associated with phobias) automatically without input from a user.

In step 406, content adaptor 110 stores user input and collected information. In this embodiment, content adaptor 110 stores user input and collected information into user preferences 118. In some embodiments, content adaptor 110 can create a user profile for the user and sort, filter, and identify user phobias and other sensitive information specific to the user.

In step 408, content adaptor 110 receives user interaction with content. In this embodiment, content adaptor 110 receives user interaction with content from one or more wearable devices connected to content adaptor 110. Examples of content can include videos, images, text files, etc. In some embodiments, content adaptor 110 can receive user interaction with content automatically, in real time. In other embodiments, content adaptor 110 can receive content before user interaction with the content in order to pre-scan the content for potentially sensitive material.

In step 410, content adaptor 110 identifies sensitive entities in the content. In this embodiment, content adaptor 110 identifies sensitive entities in the content using image recognition and a combination of machine learning, natural language processing, and artificial intelligence algorithms. In other embodiments, content adaptor 110 identifies sensitive entities according to operational steps depicted in FIGS. 2 and 3.

In step 412, content adaptor 110 determines media type associated with the content. In this embodiment, content adaptor 110 determines media type associated with the content by identifying file extensions of the received content. For example, content adaptor 110 can use file extensions (e.g., jpeg, tiff, gif, raw images, etc.) to identify image files and can similarly identify videos files based on file extensions (e.g., avi, fly, wmv, .mov, .mpeg, .mp4, etc.).

In step 414, content adaptor 110 determines contextual impact associated with each respective entity based on the media type. In this embodiment, content adaptor 110 determines contextual impact associated with each respective entity by calculating a percentage of time the entity is displayed or a percentage of size the entity occupies in an image. Content adaptor 110 can then identify the contextual impact of the entity based on the calculated percentage.

In step 416, content adaptor 110 determines whether the contextual impact associated with each respective entity reaches or exceeds a threshold for impact. In this embodiment, content adaptor 110 determines whether the contextual impact associated with each respective entity by comparing the calculated percentage of step 414 to threshold percentages as discussed in greater detail below.

In this embodiment, where content adaptor 110 identifies the media type of the content to be a video, content adaptor 110 calculates a percentage of impact the entity has by calculating a percentage of time the entity is displayed in the video and an average number of frames that entity is displayed in the video. In this embodiment, content adaptor 110 identifies that the contextual impact of the entity in a video as being relevant (i.e., modification to entity in this content would affect context surround the content) when the calculated percentage of impact for the video is greater than 1% and the average number of frames is greater than 30 frames per second. Conversely, content adaptor 110 identifies that the contextual impact of the entity in a video as being not relevant when the calculated percentage of impact for videos is not greater than 1% and the average number of frames is not greater than 30 frames per second.

In this embodiment, where content adaptor 110 identifies the media type of the content to be an image, content adaptor 110 calculates a percentage of size the entity has in relation to the entire image. In this embodiment, content adaptor 110 identifies that the contextual impact of the entity in an image as being relevant when the calculated percentage of impact for image is greater than 3% of the whole image. Conversely, content adaptor 110 identifies that the contextual impact of the entity in an image as being non relevant when the calculated percentage of impact for image is not greater than 3% of the whole image.

If, in step 415, content adaptor 110 determines that the contextual impact associated with the content reaches or exceeds a threshold for impact, then, in step 418, content adaptor 110 verifies previous use of content adaptor 110. In this embodiment, content adaptor 110 verifies previous use of content adaptor 110 by referencing user preferences 118 and determining whether a user profile for the user is available or otherwise accessible.

If, in step 415, content adaptor 110 determines that the contextual impact associated with the content does not reach or exceed a threshold for impact, then, in step 426, content adaptor 110 deletes the sensitive entity from the content. For example, in instances where content adaptor 110 has determined that an entity (e.g., a flower) does not reach or exceed the impact threshold, content adaptor 110 can delete the flower from the image. In this manner, content adaptor 110 can modify content without altering the context of the content being viewed by the user.

In step 420, content adaptor 110 determines whether previous modification was helpful. In this embodiment, content adaptor 110 determines whether previous modifications to content having that particular sensitive entity was helpful by accessing user preferences 118 and identifying user feedback.

If, in step 420, content adaptor 110 determines that the previous modification was not helpful, then, in step 422, content adaptor 110 refines modification of the sensitive content. In this embodiment, content adaptor 110 refines modification by collecting user information and feedback. For example, content adaptor 110 can continue collecting biometric information of the user and comparing the collected biometric information to baseline biometric readings (e.g., to compare a baseline heartrate of a user to the heartrate of the user after being exposed to sensitive material, modification of content, etc.). Content adaptor 110 can also collect user feedback by transmitting one or more questionnaires to the user.

If, in step 420, content adaptor 110 determines that the previous modification was helpful, then, in step 424, content adaptor 110 uses previous modification of the sensitive content. In this embodiment, content adaptor 110 can then collect user feedback to determine whether the filter was still effective. In response to determining that the modification is still effective, content adaptor 110 can update user preferences 118 to store updated user feedback. In response to determining that the modification is not effective, then content adaptor 110 can iteratively perform modifications until an acceptable level of impact is achieved.

Figure 5:
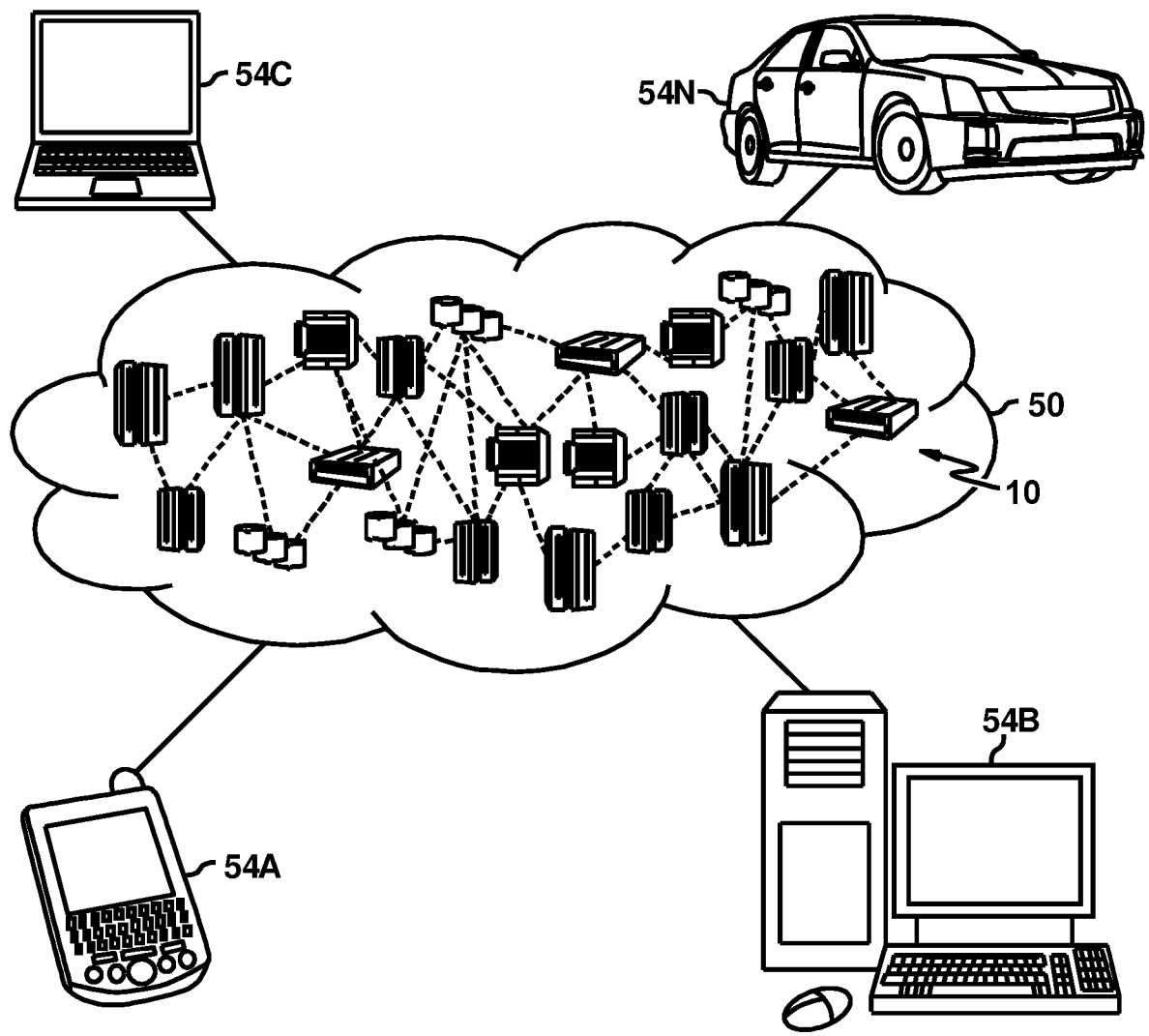
FIG. 5 depicts a cloud computing environment according to an embodiment of the present invention.

FIG. 5 depicts a cloud computing environment, according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser)

Figure 6:
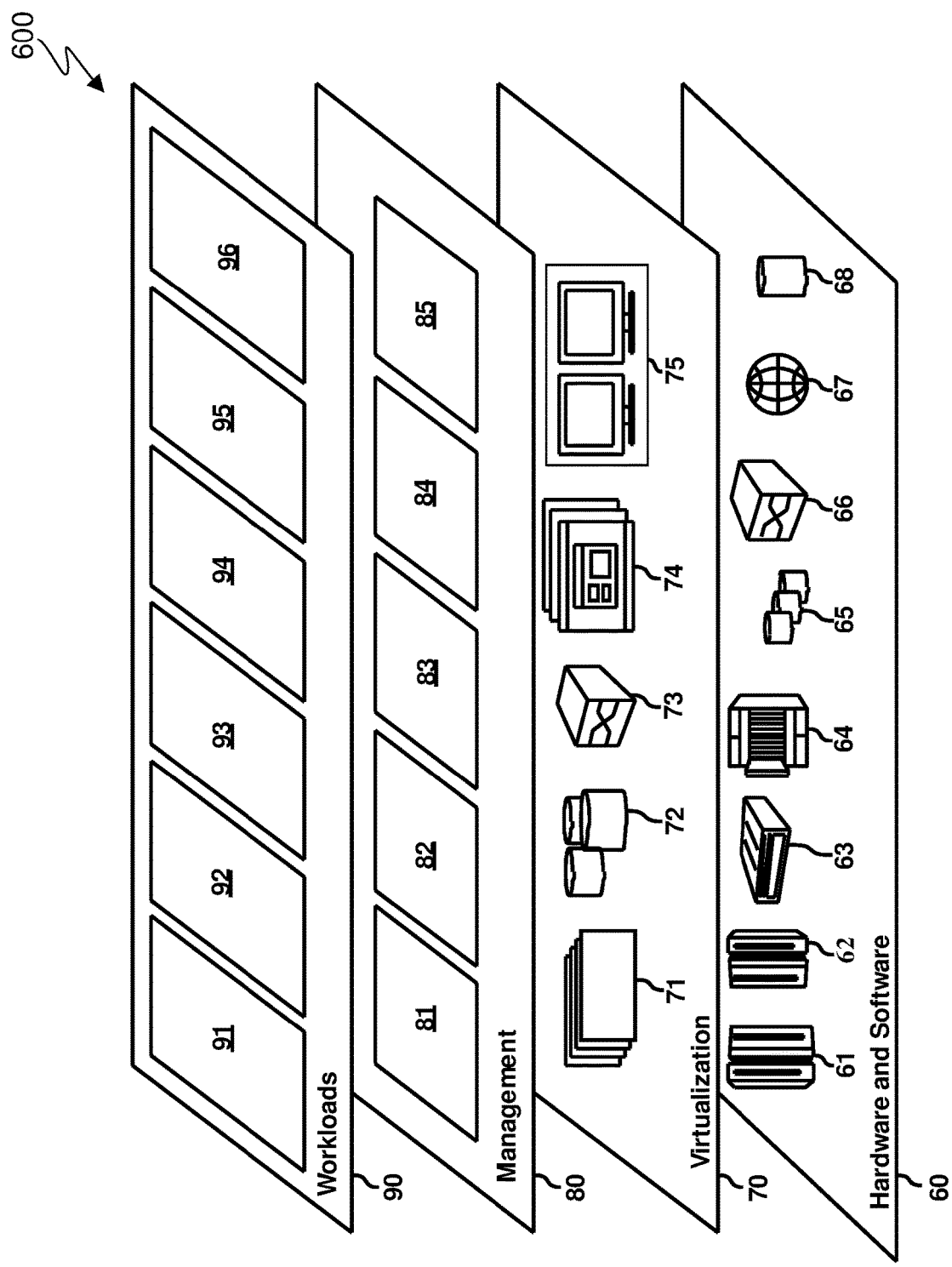
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computing environment 96.

Implementations of the invention may include a computer system/server 12 of FIG. 1 in which one or more of the program modules 42 are configured to perform (or cause the computer system/server 12 to perform) one of more functions of content adaptor 110. For example, the one or more of the program modules 42 may be configured to: identify one or more entities in media content; determine that an identified entity of the one more identified entities is associated with sensitive material; in response to determining that the identified entity of the one or more identified entities is sensitive, determine a contextual impact of the identified entity; and modify the media content based on the determined contextual impact of the identified entity.

Figure 7:
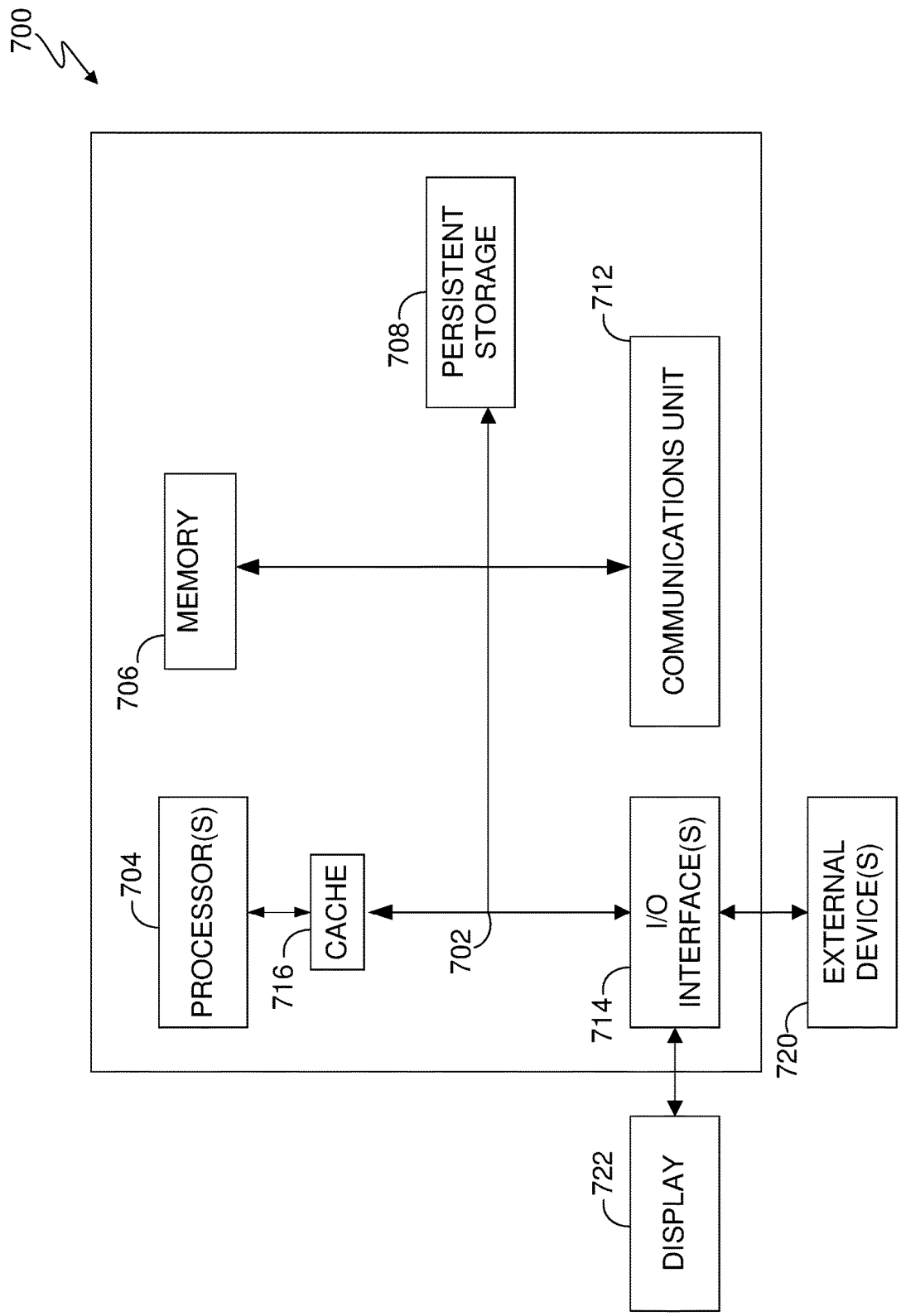
FIG. 7 depicts a block diagram of components of the computing systems of FIG. 1, in accordance with an embodiment of the present invention.

FIG. 7 depicts a block diagram of components of computing systems within computing environment 100 of FIG. 1, in accordance with an embodiment of the present invention. It should be appreciated that FIG. 7 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 700 includes communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Content adaptor 110 (not shown) may be stored in persistent storage 708 and in memory 706 for execution by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Content adaptor 110 may be downloaded to persistent storage 708 through communications unit 710.

I/O interface(s) 712 allows for input and output of data with other devices that may be connected to client computing device 102 and server computer 108. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   identifying one or more entities in media content;
   determining, based on a user profile of a user, that an identified entity of the one more identified entities is associated with sensitive material to which the user has an adverse reaction, as indicated by the user profile of the user;
   in response to determining that the identified entity of the one or more identified entities is associated with sensitive material, determining a contextual impact of the identified entity based, at least in part, on an identified media type associated with the media content, a calculated percentage of time the identified entity is displayed in the media content, and determined relevancy, wherein the determining the contextual impact of the identified entity comprises:
      identifying the media type associated with the media content;
      in response to identifying that the media type associated with the media content is a video, calculating the percentage of time the identified entity is displayed in the video; and
      performing processing based on the calculating, wherein the performing processing comprises one selected from the group consisting of:
         in response to determining that the calculated percentage of time the identified entity is displayed exceeds one percent of a duration of total time for the video and further in response to determining that an average number of frames the identified entity is displayed in exceeds thirty frames per second, identifying contextual impact of the identified entity in the video as being relevant, and
         in response to determining that the calculated percentage of time the identified entity is displayed does not exceed one percent of a duration of total time for the video and further in response to determining that an average number of frames the identified entity is displayed in does not exceed thirty frames per second, identifying contextual impact of the identified entity in the video as being non relevant; and
   automatically modifying, by a content adaptor executing on a hardware processing device, the media content based on the determined contextual impact of the identified entity, the modifying comprising performing an ameliorative action identified based on the user profile, wherein the media content comprises at least one digital image and the identified entity appears adjacent at least one other entity in the at least one digital image, and wherein the modifying automatically modifies the identified entity in the at least one digital image and retains the at least one other entity in the at least one digital image to produce a modified version of the media content for presentation to the user.

2. The computer-implemented method of claim 1, wherein the determining that the identified entity of the one more identified entities is associated with sensitive material comprises:
   generating a similarity score indicative of relatedness between the identified entity and one or more other entities associated with sensitive material; and
   in response to the generated similarity score reaching or exceeding a similarity threshold, classifying the identified entity as sensitive material.

3. The computer-implemented method of claim 1, wherein the media content is initially an unmodified version of the media content, wherein the modifying the media content based on the determined contextual impact of the identified entity comprises:
   altering the identified entity to produce the modified version of the media content with the altered identified entity therein such that the altered identified entity therein is still representative of the identified entity in the unmodified version of the media content.

4. A computer program product comprising:
   one or more computer readable storage media and program instructions stored on the one or more computer readable storage media, the program instructions comprising:
      program instructions to identify one or more entities in media content;
      program instructions to determine, based on a user profile of a user, that an identified entity of the one more identified entities is associated with sensitive material to which the user has an adverse reaction, as indicated by the user profile of the user;
      program instructions to, in response to determining that the identified entity of the one or more identified entities is associated with sensitive material, determine a contextual impact of the identified entity based, at least in part, on an identified media type associated with the media content, a calculated percentage of time the identified entity is displayed in the media content, and determined relevancy, wherein the program instructions to determe the contextual impact of the identified entity comprise:
         program instructions to identify the media type associated with the media content;
         program instructions to, in response to identifying that the media type associated with the media content is a video, calculate the percentage of time the identified entity is displayed in the video; and
         program instructions to performing processing based on the calculating, wherein the program instructions to perform processing comprise at least one selected from the group consisting of:
            program instructions to, in response to determining that the calculated percentage of time the identified entity is displayed exceeds one percent of a duration of total time for the video and further in response to determining that an average number of frames the identified entity is displayed in exceeds thirty frames per second, identify contextual impact of the identified entity in the video as being relevant; and program instructions to, in response to determining that the calculated percentage of time the identified entity is displayed does not exceed one percent of a duration of total time for the video and further in response to determining that an average number of frames the identified entity is displayed in does not exceed thirty frames per second, identifying contextual impact of the identified entity in the video as being non relevant; and program instructions to automatically modify, by a content adaptor executing on a hardware processing device, the media content based on the determined contextual impact of the identified entity, the program instructions to modify comprising program instructions to perform an ameliorative action identified based on the user profile, wherein the media content comprises at least one digital image and the identified entity appears adjacent at least one other entity in the at least one digital image, and wherein the modifying automatically modifies the identified entity in the at least one digital image and retains the at least one other entity in the at least one digital image to produce a modified version of the media content for presentation to the user.

5. The computer program product of claim 4, wherein the program instructions to determine that the identified entity of the one more identified entities is associated with sensitive material comprise:

program instructions to generate a similarity score indicative of relatedness between the identified entity and one or more other entities associated with sensitive material; and program instructions to, in response to the generated similarity score reaching or exceeding a similarity threshold, classify the identified entity as sensitive material.

6. The computer program product of claim 4, wherein the media content is initially an unmodified version of the media content, wherein the program instructions to modify the media content based on the determined contextual impact of the identified entity comprise:

program instructions to alter the identified entity to produce the modified version of the media content with the altered identified entity therein such that the altered identified entity therein is still representative of the identified entity in the unmodified version of the media content.

7. A computer system comprising:
one or more computer processors;
one or more computer readable storage media; and
program instructions stored on the one or more computer readable storage media for execution by at least one of the one or more computer processors, the program instructions comprising:

program instructions to identify one or more entities in media content;

program instructions to determine, based on a user profile of a user, that an identified entity of the one more identified entities is associated with sensitive material to which the user has an adverse reaction, as indicated by the user profile of the user;

program instructions to, in response to determining that the identified entity of the one or more identified entities is associated with sensitive material, determine a contextual impact of the identified entity based, at least in part, on an identified media type associated with the media content, a calculated percentage of time the identified entity is displayed in the media content, and determined relevancy, wherein the program instructions to determe the contextual impact of the identified entity comprise:

program instructions to identify the media type associated with the media content;

program instructions to, in response to identifying that the media type associated with the media content is a video, calculate the percentage of time the identified entity is displayed in the video; and program instructions to performing processing based on the calculating, wherein the program instructions to perform processing comprise at least one selected from the group consisting of:

program instructions to, in response to determining that the calculated percentage of time the identified entity is displayed exceeds one percent of a duration of total time for the video and further in response to determining that an average number of frames the identified entity is displayed in exceeds thirty frames per second, identify contextual impact of the identified entity in the video as being relevant; and program instructions to, in response to determining that the calculated percentage of time the identified entity is displayed does not exceed one percent of a duration of total time for the video and further in response to determining that an average number of frames the identified entity is displayed in does not exceed thirty frames per second, identifying contextual impact of the identified entity in the video as being non relevant; and program instructions to automatically modify, by a content adaptor executing on a hardware processing device, the media content based on the determined contextual impact of the identified entity, the program instructions to modify comprising program instructions to perform an ameliorative action identified based on the user profile, wherein the media content comprises at least one digital image and the identified entity appears adjacent at least one other entity in the at least one digital image, and wherein the modifying automatically modifies the identified entity in the at least one digital image and retains the at least one other entity in the at least one digital image to produce a modified version of the media content for presentation to the user.

8. The computer system of claim 7, wherein the program instructions to determine that the identified entity of the one more identified entities is associated with sensitive material comprise:

program instructions to generate a similarity score indicative of relatedness between the identified entity to one or more other entities associated with sensitive material; and program instructions to, in response to the generated similarity score reaching or exceeding a similarity threshold, classify the identified entity as sensitive material.

* * * * *